United States Patent
Matsushita

(10) Patent No.: US 10,523,026 B2
(45) Date of Patent: Dec. 31, 2019

(54) ELECTRIC POWER SUPPLY SYSTEM

(71) Applicant: TOYOTA JIDOSHA KABUSHIKI KAISHA, Toyota-shi, Aichi-ken (JP)

(72) Inventor: Naoto Matsushita, Okazaki (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 69 days.

(21) Appl. No.: 15/877,544

(22) Filed: Jan. 23, 2018

(65) Prior Publication Data

US 2018/0219397 A1 Aug. 2, 2018

(30) Foreign Application Priority Data

Jan. 31, 2017 (JP) ................. 2017-015674

(51) Int. Cl.
| | | |
|---|---|---|
| *H02J 7/00* | (2006.01) | |
| *B60L 3/00* | (2019.01) | |
| *H02J 1/10* | (2006.01) | |
| *H02J 7/34* | (2006.01) | |
| *B60L 53/14* | (2019.01) | |
| *B60L 58/20* | (2019.01) | |
| *B60L 53/22* | (2019.01) | |
| *B60L 58/12* | (2019.01) | |
| *B60L 58/21* | (2019.01) | |

(52) U.S. Cl.
CPC .......... *H02J 7/0054* (2013.01); *B60L 3/0046* (2013.01); *B60L 53/14* (2019.02); *B60L 53/22* (2019.02); *B60L 58/12* (2019.02); *B60L 58/20* (2019.02); *B60L 58/21* (2019.02); *H02J 1/108* (2013.01); *H02J 7/0068* (2013.01); *H02J 7/34* (2013.01); *B60L 2240/80* (2013.01)

(58) Field of Classification Search
CPC ........ H02J 7/0054; H02J 1/108; H02J 7/0068; H02J 7/34; B60L 53/22; B60L 53/14; B60L 58/12; B60L 58/21; B60L 58/20; B60L 3/0046
USPC .................................................. 320/104, 126
See application file for complete search history.

(56) References Cited

U.S. PATENT DOCUMENTS

| | | | | |
|---|---|---|---|---|
| 2014/0111120 | A1* | 4/2014 | Mitsutani | B60L 15/00 318/139 |
| 2015/0329007 | A1* | 11/2015 | Matsunaga | H01M 10/0525 320/126 |
| 2016/0082849 | A1* | 3/2016 | Yamasaki | B60L 1/00 290/3 |
| 2017/0149102 | A1* | 5/2017 | Yamato | H02J 7/34 |

FOREIGN PATENT DOCUMENTS

JP          2015-095971 A          5/2015

* cited by examiner

Primary Examiner — Zixuan Zhou
(74) Attorney, Agent, or Firm — Oliff PLC

(57) ABSTRACT

An electric power supply system includes a charger, first and second high electric potential side lines, first and second diodes, a first battery and a first load, a second battery and a second load, a first switch, a second switch, and a control device. The control device is configured to switch the first switch to an open state and maintain the second switch in a close state when the first battery reaches a predetermined level or higher of a state of charge earlier than the second battery after the control device starts charging the first battery and the second battery.

5 Claims, 4 Drawing Sheets

ELECTRIC POWER SUPPLY SYSTEM

INCORPORATION BY REFERENCE

The disclosure of Japanese Patent Application No. 2017-015674 filed on Jan. 31, 2017 including the specification, drawings and abstract is incorporated herein by reference in its entirety.

BACKGROUND

1. Technical Field

The present disclosure relates to an electric power supply system.

2. Description of Related Art

In a well-known technology (refer to, for example, Japanese Unexamined Patent Application Publication No. 2015-095971 (JP 2015-095971 A)), a charger is connected to an electric power supply circuit having a plurality of batteries, and each battery is charged through the charger.

SUMMARY

The technology may not be applied to an electric power supply system that has two structures of electric power supply circuits connected in parallel with the charger. In the electric power supply system having two structures of electric power supply circuits, when the battery of each structure is charged through a common charger, the state of charge of the battery may be different between the structures. Accordingly, the battery of one structure may be fully charged more quickly than the battery of the other structure. In such a case, it is difficult to fully charge the battery of the other structure while preventing the battery of one structure from being overcharged.

The present disclosure provides an electric power supply system that has two structures of electric power supply circuits and that is capable of charging a battery of each structure to a desired state of charge through a common charger while preventing the battery from being overcharged.

An aspect of the present disclosure relates to an electric power supply system including a charger; a first high electric potential side lines that is connected to a high electric potential side of the charger; a second high electric potential side lines that is connected to the high electric potential side of the charger; a first diode that is disposed on the first high electric potential side line and of which an anode side is connected to the charger; a second diode that is disposed on the second high electric potential side line and of which an anode side is connected to the charger; a first battery and a first load that are connected in parallel with each other between a ground and a cathode side of the first diode on the first high electric potential side line; a second battery and a second load that are connected in parallel with each other between the ground and a cathode side of the second diode on the second high electric potential side line; a first switch that is disposed between the first high electric potential side line and the first battery, or between the first battery and the ground; a second switch that is disposed between the second high electric potential side line and the second battery, or between the second battery and the ground; and a control device configured to start charging the first battery and the second battery through the charger by setting the first and second switches to a close state and operating the charger. The control device is configured to switch the first switch to an open state and maintain the second switch in the close state when the first battery reaches a predetermined level or higher of a state of charge earlier than the second battery after the control device starts charging the first battery and the second battery.

According to the aspect of the present disclosure, the first diode and the second diode prevent currents from circulating to another structure. Accordingly, charging of the first battery and the second battery through the charger is realized for each structure through the first diode and the second diode. In the aspect of the present disclosure, the first switch is switched to the open state when the first battery reaches the predetermined level or higher of a state of charge first after the start of charging of the first battery and the second battery. Accordingly, overcharging that may be caused by further charging the first battery from the predetermined level or higher can be prevented. In such a case, since the second switch is maintained in the close state, charging of the second battery (a battery that does not have the predetermined level or higher of a state of charge) can be continued, and the second battery can be charged to a desired state of charge. Accordingly, according to the aspect of the present disclosure, an electric power supply system having two structures of electric power supply circuits can charge a first battery and a second battery to a desired state of charge through a common charger while preventing the first battery and the second battery from being overcharged. Even when the first switch is in the open state, the first load is being supplied with electric power from the charger. Thus, the first load does not consume the electric power of the first battery while the second battery is charged. Thus, the amount of electricity with which the first battery is charged can be maintained at the predetermined level during charging of the second battery.

The electric power supply system according to the aspect of the present disclosure may further include a first voltage conversion device that operates with direct current and is electrically connected to the first battery in a parallel relationship between the ground and the cathode side of the first diode on the first high electric potential side line; a third battery that has a lower rated voltage than the first battery and is electrically connected between the ground and a low electric potential side of the first voltage conversion device; a second voltage conversion device that operates with direct current and is electrically connected to the second battery in a parallel relationship between the ground and the cathode side of the second diode on the second high electric potential side line; and a fourth battery that has a lower rated voltage than the second battery and is electrically connected between the ground and a low electric potential side of the second voltage conversion device. The control device may be configured to charge the third battery and the fourth battery through the charger by operating the first voltage conversion device and the second voltage conversion device while charging the first battery and the second battery through the charger.

According to the aspect of the present disclosure, two batteries of a high voltage structure and a low voltage structure can be disposed in each of two structures, and a redundant structure can be formed within each structure in accordance with a difference in the characteristic of each load. The third battery and the fourth battery can be charged along with the first battery and the second battery through the charger.

In the electric power supply system according to the aspect of the present disclosure, when the third battery reaches a full state of charge while the control device charges the third battery through the charger, the control device may be configured to set a target value of an output voltage of the first voltage conversion device to a value acquired by adding a first predetermined value to an open-circuit voltage of the third battery, based on the open-circuit voltage of the third battery. When the fourth battery reaches a full state of charge while the control device charges the fourth battery through the charger, the control device may be configured to set a target value of an output voltage of the second voltage conversion device to a value acquired by adding a second predetermined value to an open-circuit voltage of the fourth battery, based on the open-circuit voltage of the fourth battery.

According to the aspect of the present disclosure, charging of the first battery and the second battery through the charger or charging of the second battery through the charger can be continued with the ability to maintain the full state of charge of the third battery and the fourth battery while preventing the third battery and the fourth battery from being overcharged.

In the electric power supply system according to the aspect of the present disclosure, the first battery, the first load, the first voltage conversion device, and the third battery may be connected commonly to a first ground line. The second battery, the second load, the second voltage conversion device, and the fourth battery may be connected commonly to a second ground line. The first switch may be disposed between the first battery and the first ground line. The second switch may be disposed between the second battery and the second ground line.

According to the aspect of the present disclosure, a high voltage structure and a low voltage structure can be connected with each other through a common ground line within each structure, and the high voltage structure and the low voltage structure do not need to be electrically insulated from each other. While the high voltage structure and the low voltage structure are conducted to each other through the common ground line, the high voltage structure and the low voltage structure can also be electrically disconnected from each other on the ground side by setting the first switch and the second switch to the open state.

In the electric power supply system according to the aspect of the present disclosure, the first load and the second load may consume electric power under control of the control device.

According to the aspect of the present disclosure, an electric power supply system that has two structures of electric power supply circuits and is capable of charging a battery of each structure to a desired state of charge through a common charger while preventing the battery from being overcharged can be provided.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Hereinafter, an embodiment will be described in detail with reference to the appended drawings. In the following description, "connection" means "electrical connection".

Figure 1:
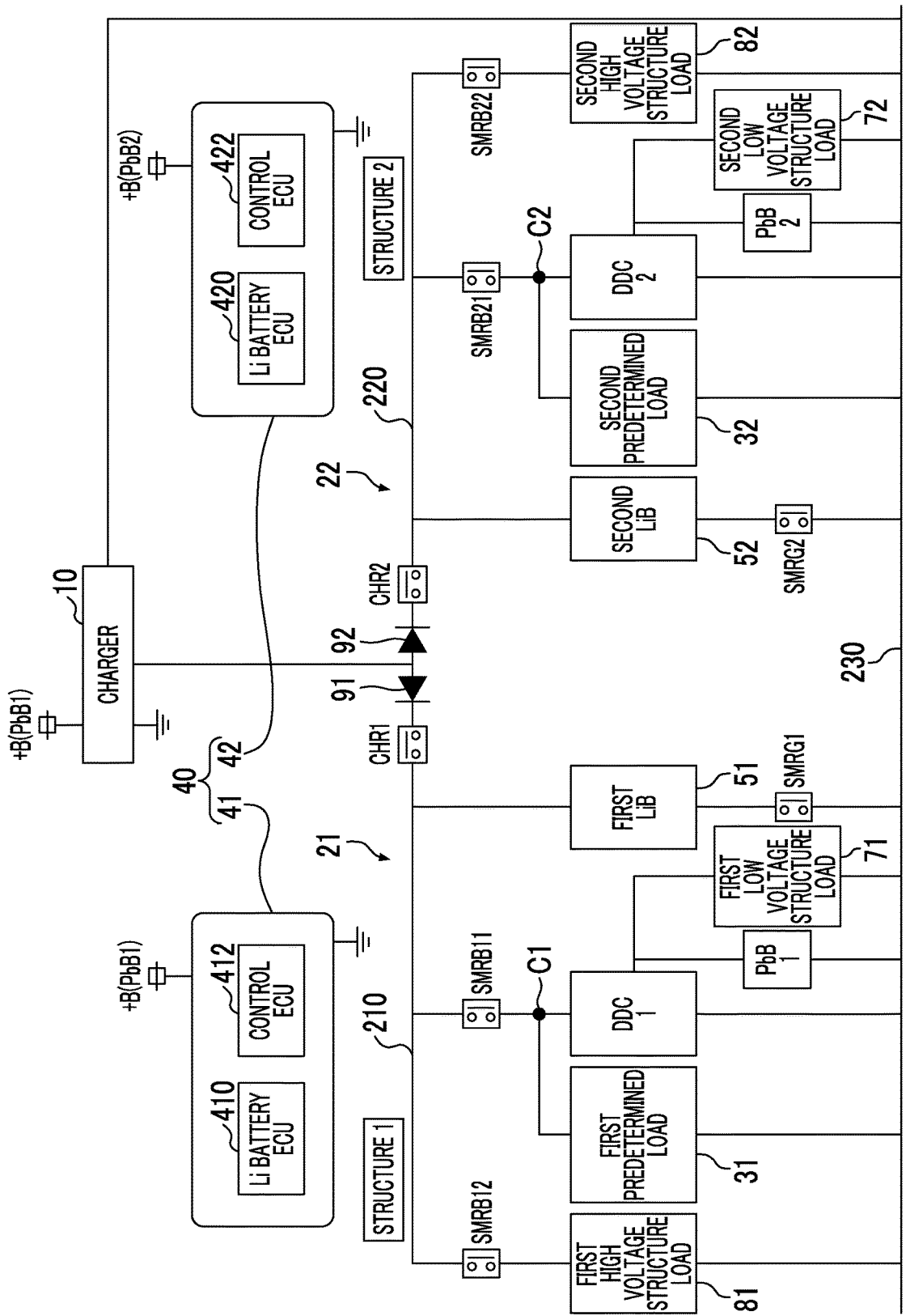
FIG. 1 is a diagram illustrating a schematic overall configuration of an electric power supply system according to one embodiment.

FIG. 1 is a diagram illustrating a schematic overall configuration of an electric power supply system 1 according to one embodiment. In FIG. 1, a first controller 41 and a second controller 42 are illustrated as being disconnected from an electric circuit.

The electric power supply system 1 is mounted in a vehicle. The vehicle is, for example, a plug-in hybrid car, an electric automobile, or an electric vehicle. Hereinafter, the vehicle will be illustratively described as a three-wheel electric vehicle having two front wheels and one rear wheel. Such a type of electric vehicle enables a leaning operation. The leaning operation is an operation of leaning (inclining) the wheels and the entire vehicle body.

The electric power supply system 1 includes a charger 10, a first circuit 21, a second circuit 22, the first controller 41, and the second controller 42.

The charger 10 can be connected to an external charging facility through a cable (not illustrated). The charger 10 can receive electric power from the charging facility in a state in which the charger 10 is connected to the external charging facility. The electric power acquired through the charger 10 charges a first lithium ion battery 51, a second lithium ion battery 52, and the like described below.

As illustrated in FIG. 1, the charger 10 performs a charging operation based on an electric power supply voltage (+B) from a lead battery PbB1 described below. That is, the charger 10 performs a charging operation by receiving electric power supplied from the lead battery PbB1.

The first circuit 21 is connected to the charger 10. The first circuit 21 has a first high electric potential side line 210 and a ground line 230. The first high electric potential side line 210 is connected to the high electric potential side of the charger 10. A first diode 91 is disposed on the first high electric potential side line 210 of the first circuit 21. The first diode 91 is disposed in a direction in which the anode side thereof is connected to the charger 10. Accordingly, the first diode 91 prevents a flow of current toward the charger 10 and the second circuit 22 in the first high electric potential side line 210.

The first lithium ion battery 51 (one example of a first battery) (first LiB in FIG. 1) and a first high voltage structure load 81 are disposed on the cathode side of the first diode 91 in the first circuit 21. The first lithium ion battery 51 constitutes a high voltage structure. The first lithium ion battery 51 constitutes a 52 V electric power supply. The first high voltage structure load 81 includes an inverter for driving a traveling motor.

A DC-DC converter DDC1 (one example of a first voltage conversion device) that is a voltage conversion device operating with a direct current is disposed in the first circuit 21. A first low voltage structure load 71 is disposed on the low voltage side of the DC-DC converter DDC1. The lead battery PbB1 (one example of a third battery) is disposed on the low voltage side of the DC-DC converter DDC1. A low electric potential side refers to the output side of the DC-DC converter DDC1 when the DC-DC converter DDC1 performs a step-down operation, and has a higher electric potential (for example, approximately 12 V) than the ground line 230 (one example of a first ground line and a second ground line).

The DC-DC converter DDC1 is a step-down converter. When the DC-DC converter DDC1 performs a step-down operation, the DC-DC converter DDC1 steps down the voltage of the high electric potential side (first high electric potential side line 210 side) and outputs the stepped-down voltage to the low electric potential side (the lead battery PbB1 and the first low voltage structure load 71). The DC-DC converter DDC1 may be a step-up and step-down converter. In such a case, when the DC-DC converter DDC1 performs a step-up operation, the DC-DC converter DDC1 steps up the voltage of the low electric potential side thereof (the positive electrode side of the lead battery PbB1) and outputs the stepped-up voltage to the high electric potential side. The first low voltage structure load 71 includes the first controller 41 that controls a system needing a continuous supply of electric power (for example, a by-wire system), the charger 10, the first lithium ion battery 51, and the first circuit 21 (the DC-DC converter DDC1 or various relays such as a relay SMRG1). The first controller 41 includes one electronic control unit (ECU) or more. For example, the first controller 41 includes a Li battery ECU 410 and a control ECU 412. The Li battery ECU 410 monitors the first lithium ion battery 51. The control ECU 412 monitors the lead battery PbB1 and controls the DC-DC converter DDC1, the charger 10, and various relays such as the relay SMRG1.

A first predetermined load 31 of the high voltage structure is disposed between the ground line 230 and a connection point C1 on the high voltage side of the DC-DC converter DDC1. The first predetermined load 31 is an actuator that constitutes the system needing a continuous supply of electric power. For example, the first predetermined load 31 is an actuator for the leaning operation and constitutes a by-wire system. The first predetermined load 31, the first low voltage structure load 71, and the first high voltage structure load 81 are electrical loads (one example of a first load) that are connected in a parallel relationship with the first lithium ion battery 51 between the first high electric potential side line 210 and the ground line 230.

Relays CHR1, SMRB11, SMRB12 are disposed on the high electric potential side. The relay CHR1 is directly connected to the cathode of the first diode 91. All elements within the first circuit 21 described by using FIG. 1 are connected to the charger 10 through the relay CHR1 and the first diode 91 on the high electric potential side.

The relays SMRB11, SMRB12 are disposed in parallel with each other between the first high electric potential side line 210 and the ground line 230. The relay SMRB11 is disposed between the connection point C1 and the first high electric potential side line 210. The relay SMRB12 is disposed between the first high voltage structure load 81 and the first high electric potential side line 210. The normal state of each of the relays CHR1, SMRB11, SMRB12 is, for example, an open state.

The relay SMRG1 (one example of a first switch) is disposed between the first lithium ion battery Si and the ground line 230. The relay SMRG1 selectively forms an open state and a close state. In the open state of the relay SMRG1, the first lithium ion battery 51 is electrically disconnected from the first circuit 21. In the close state of the relay SMRG1, the first lithium ion battery 51 is electrically incorporated in the first circuit 21. The normal state of the relay SMRG1 is, for example, the open state.

In the example illustrated in FIG. 1, the first lithium ion battery 51, the first high voltage structure load 81, and the DC-DC converter DDC1 are connected in parallel with each other through the first diode 91 between the ground line 230 and the first high electric potential side line 210 from the charger 10. Accordingly, the ground line 230 is common in a low voltage structure and the high voltage structure. In the example illustrated in FIG. 1, the ground line 230 is common in the first circuit 21 and the second circuit 22.

The second circuit 22 is connected to the charger 10 in a parallel relationship with the first circuit 21. The second circuit 22 has a second high electric potential side line 220 and the ground line 230. The second high electric potential side line 220 is connected to the high electric potential side of the charger 10. A second diode 92 is disposed on the second high electric potential side line 220 of the second circuit 22. The second diode 92 is disposed in a direction in which the anode side thereof is connected to the charger 10. Accordingly, the second diode 92 prevents a flow of current toward the charger 10 and the first circuit 21 in the second high electric potential side line 220.

The second lithium ion battery 52 and a second high voltage structure load 82 are disposed on the cathode side of the second diode 92 in the second circuit 22. The second lithium ion battery 52 (one example of a second battery) (second LiB in FIG. 1) and the second high voltage structure load 82 are connected in parallel with each other between the second high electric potential side line 220 and the ground line 230. The second lithium ion battery 52 constitutes a high voltage structure. The second lithium ion battery 52 constitutes, for example, a 52 V electric power supply. The second high voltage structure load 82 includes an inverter for driving the traveling motor. The second high voltage structure load 82 is the same as the first high voltage structure load 81 and constitutes a redundant structure of two structures.

A DC-DC converter DDC2 (one example of a second voltage conversion device) that is a voltage conversion device operating with a direct current is disposed in the second circuit 22. A second low voltage structure load 72 is disposed on the low voltage side of the DC-DC converter DDC2. A lead battery PbB2 (one example of a fourth battery) is disposed on the low voltage side of the DC-DC converter DDC2. A low electric potential side refers to the output side of the DC-DC converter DDC2 When the DC-DC converter DDC2 performs a step-down operation, and has a higher electric potential (for example, approximately 12 V) than the ground line 230.

The DC-DC converter DDC2 is a step-down converter. When the DC-DC converter DDC2 performs a step-down operation, the DC-DC converter DDC2 steps down the voltage of the high electric potential side (second high electric potential side line 220 side) and outputs the stepped-down voltage to the low electric potential side (the lead battery PbB2 and the second low voltage structure load 72). The DC-DC converter DDC2 may be a step-up and step-down converter. In such a case, when the DC-DC converter DDC2 performs a step-up operation, the DC-DC converter DDC2 steps up the voltage of the low electric potential side thereof (the positive electrode side of the lead battery PbB2) and outputs the stepped-up voltage to the high electric potential side. The second low voltage structure load 72 includes the second controller 42 that controls a system needing a continuous supply of electric power (for example, a by-wire system), the second lithium ion battery 52, and the second circuit 22 (the DC-DC converter DDC2 or various relays such as a relay SMRG2). The second controller 42 includes two or more ECUs. For example, the second controller 42 includes a Li battery ECU 420 and a control ECU 422. The Li battery ECU 420 monitors the second lithium ion battery 52. The control ECU 422 monitors the lead battery PbB2 and controls the DC-DC converter DDC2 and various relays such as the relay SMRG2.

A second predetermined load 32 of the high voltage structure is disposed between the ground line 230 and a connection point C2 on the high voltage side of the DC-DC converter DDC2. The second predetermined load 32 is an actuator that constitutes the system needing a continuous supply of electric power. For example, the second predetermined load 32 is an actuator for the leaning operation and constitutes a by-wire system. The second predetermined load 32 is the same as the first predetermined load 31 and constitutes a redundant structure of two structures. The second predetermined load 32, the second low voltage structure load 72, and the second high voltage structure load 82 are electrical loads (one example of a second load) that are connected in a parallel relationship with the second lithium ion battery 52 between the second high electric potential side line 220 and the ground line 230.

Relays CHR2, SMRB21, SMRB22 are disposed on the high electric potential side. The relay CHR2 is directly connected to the cathode of the second diode 92. All elements within the second circuit 22 described by using FIG. 1 are connected to the charger 10 through the relay CHR2 and the second diode 92 on the high electric potential side.

The relays SMRB21, SMRB22 are disposed in parallel with each other between the second high electric potential side line 220 and the ground line 230. The relay SMRB21 is disposed between the connection point C2 and the second high electric potential side line 220. The relay SMRB22 is disposed between the second high voltage structure load 82 and the second high electric potential side line 220. The normal state of each of the relays CHR2, SMRB21, SMRB22 is, for example, an open state.

The relay SMRG2 (one example of a second switch) is disposed between the second lithium ion battery 52 and the ground line 230. The relay SMRG2 selectively forms an open state and a close state. In the open state of the relay SMRG2, the second lithium ion battery 52 is electrically disconnected from the second circuit 22. In the close state of the relay SMRG2, the second lithium ion battery 52 is electrically incorporated in the second circuit 22. The normal state of the relay SMRG2 is, for example, the open state.

In the example illustrated in FIG. 1, the second lithium ion battery 52, the second high voltage structure load 82, and the DC-DC converter DDC2 are connected in parallel with each other through the second diode 92 between the ground line 230 and the second high electric potential side line 220 from the charger 10. Accordingly, the ground line 230 is common in a low voltage structure and the high voltage structure.

The electric power supply system 1 enables two structures of electric power supply circuits to be formed. Thus, a redundant structure that is robust against failure can be realized. For example, when the first circuit 21 side fails, the second high voltage structure load 82, the second low voltage structure load 72, or the second predetermined load 32 can be operated by using the second circuit 22. When the DC-DC converter DDC2 is a step-up and step-down converter, the second low voltage structure load 72 and the second predetermined load 32 can be operated by using the lead battery PbB2 and the DC-DC converter DDC2 even when the second lithium ion battery 52 fails in the second circuit 22.

The electric power supply system 1 has the ground line 230 that is common in the low voltage structure and the high voltage structure. Thus, the electric power supply system 1 does not need a structure (for example, a photodiode) that is needed when the low voltage structure and the high voltage structure are electrically insulated from each other, and can realize a simple structure. In the electric power supply system 1, the relay SMRG1 is disposed between the first lithium ion battery 51 and the ground line 230, and the relay SMRG2 is disposed between the second lithium ion battery 52 and the ground line 230. Accordingly, the low voltage structure and the high voltage structure can be electrically disconnected from each other in the ground side when needed. The relays SMRB11, SMRB12, SMRB21, SMRB22 are disposed in the electric power supply system 1. Thus, the low voltage structure and the high voltage structure can be electrically disconnected from each other on the high electric potential side when needed.

Next, the function of a control device 40 will be described. The first controller 41 and the second controller 42 constitute the control device 40.

Various types of control executed by the control device 40 include control of various electrical loads (the first predetermined load 31, the first low voltage structure load 71, the first high voltage structure load 81, the second predetermined load 32, the second low voltage structure load 72, the second high voltage structure load 82, and the like) and control of charging through the charger 10. The first predetermined load 31, the first low voltage structure load 71, the first high voltage structure load 81, the second predetermined load 32, the second low voltage structure load 72, and the second high voltage structure load 82 consume electric power under control of the control device 40. Hereinafter, control of charging through the charger 10 will be mainly described. Control of charging through the charger 10 is executed in a state in which the charger 10 is connected to the external charging facility through the cable.

The control device 40 starts charging the first lithium ion battery 51 and the second lithium ion battery 52 through the charger 10 by setting the relays CHR1, CHR2, SMRG1, SMRG2 to the close state and setting the charger 10 in operation (causing the charger 10 to perform a charging operation).

Figure 2:
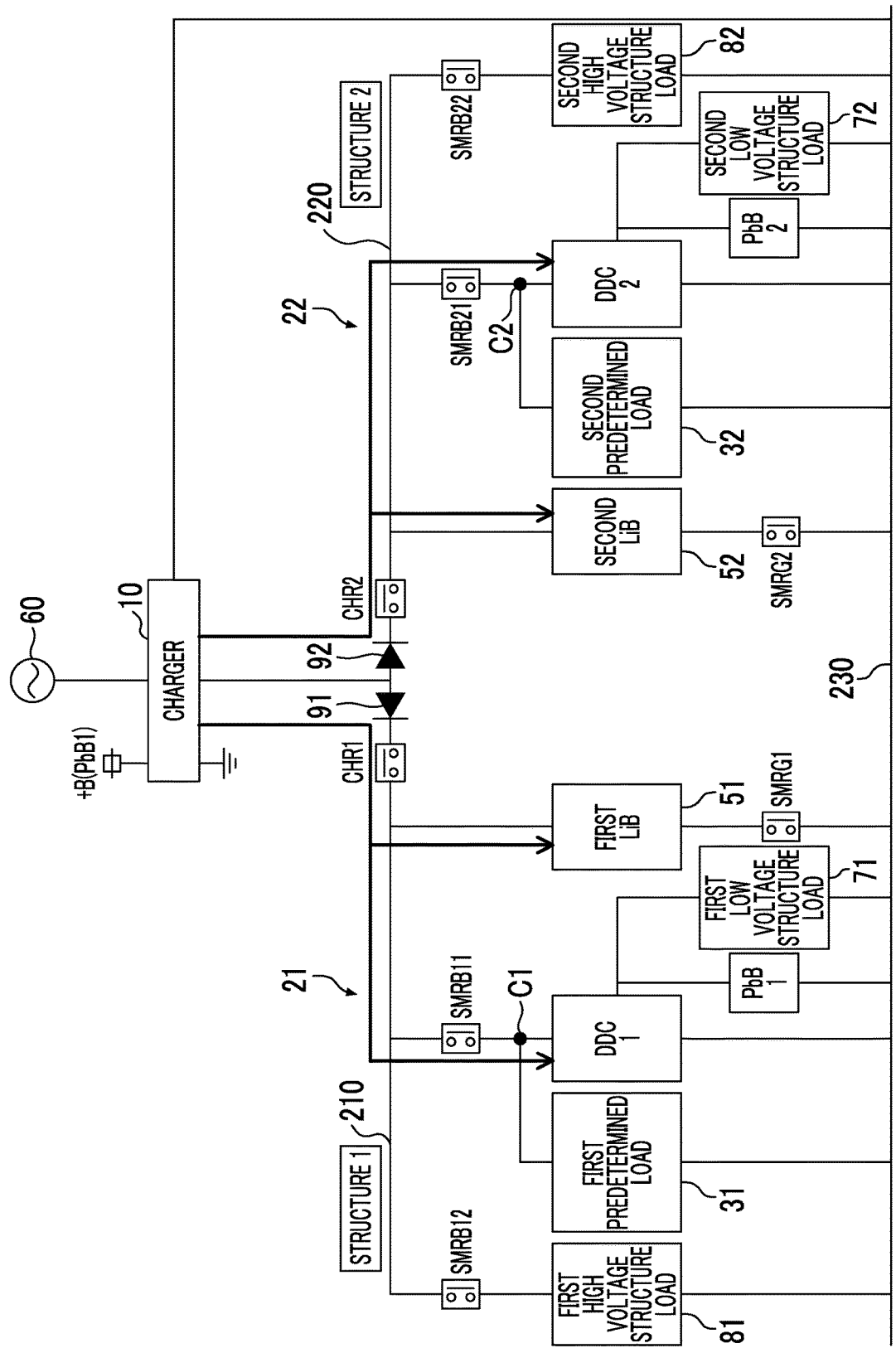
FIG. 2 is a diagram describing a state of the electric power supply system during charging of a first lithium ion battery and a second lithium ion battery.

FIG. 2 is a diagram describing the state of the electric power supply system 1 during charging of the first lithium ion battery 51 and the second lithium ion battery 52. FIG. 2 illustrates a state in which any of the first lithium ion battery 51 and the second lithium ion battery 52 is not fully charged. In FIG. 2, an alternating current electric power supply 60 of the external charging facility is schematically illustrated, and the direction of a flow of current is schematically illustrated by an arrow In the example illustrated in FIG. 2, the control device 40 charges the lead battery PbB1 and the lead battery PbB2 through the charger 10 at the same time as charging the first lithium ion battery 51 and the second lithium ion battery 52, by setting the relays SMRB11, SMRB21 to the close state and setting the DC-DC converters DDC1, DDC2 in operation. Hereinafter, as illustrated in FIG. 2, the control device 40 will be illustratively assumed to charge the first lithium ion battery 51, the second lithium ion battery 52, the lead battery PbB1, and the lead battery PbB2 through the charger 10.

When the first lithium ion battery 51 reaches a predetermined level or higher of a state of charge first of the first lithium ion battery 51 and the second lithium ion battery 52 after the control device 40 starts charging the first lithium ion battery 51 and the second lithium ion battery 52, the control device 40 sets the relay SMRG1 (a relay related to the first lithium ion battery 51) to the open state of the relays SMRG1, SMRG2. In such a case, the relays CHR1, CHR2, SMRB11, SMRB21, SMRG2 are maintained in the close state. Hereinafter, the process of setting the relay SMRG1 to the open state due to the first lithium ion battery 51 reaching the full state of charge earlier than the second lithium ion battery 52 will be referred to as a "fully charged side disconnection process" related to a first structure.

Figure 3:
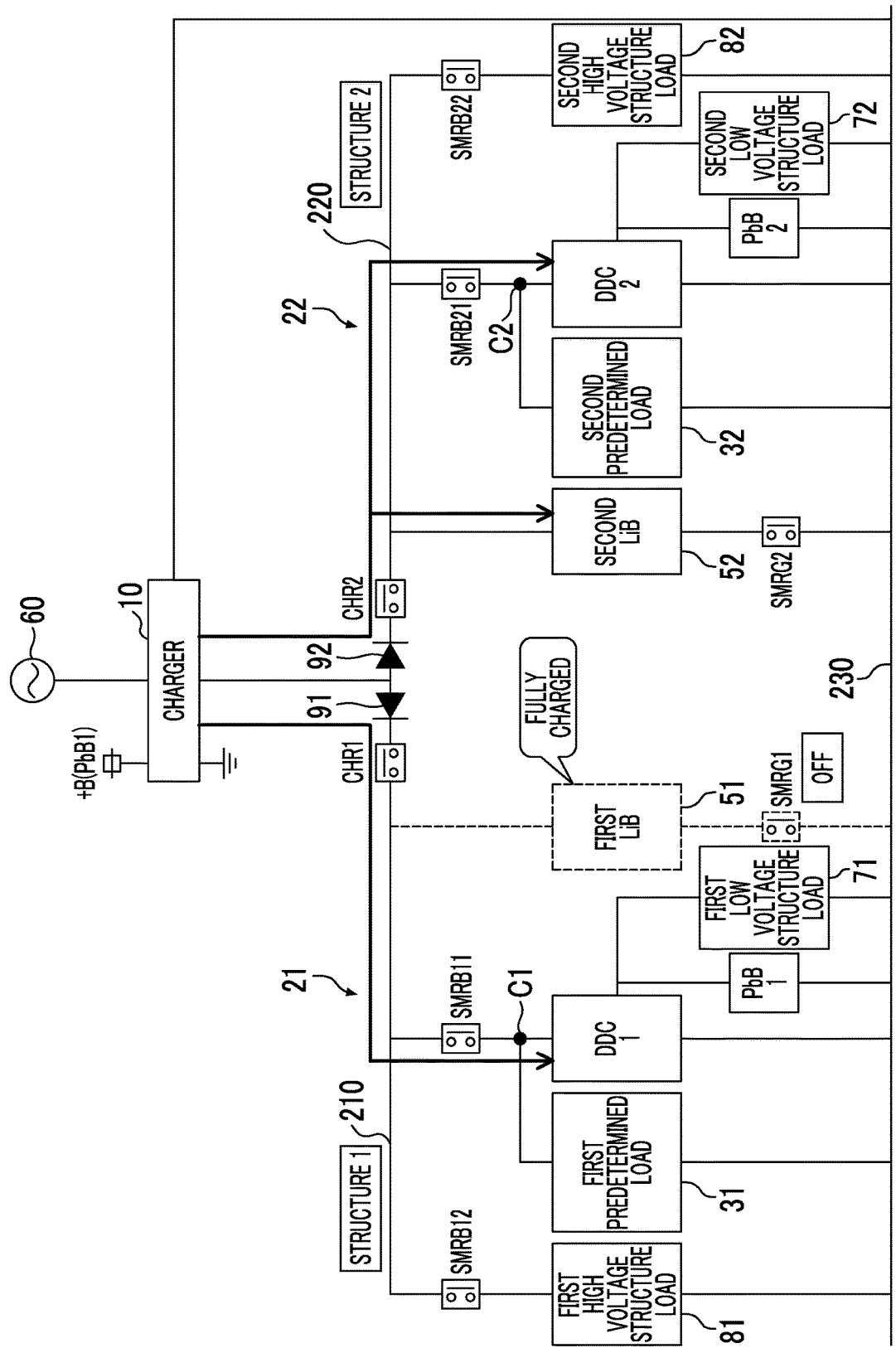
FIG. 3 is a diagram describing the state of the electric power supply system after a fully charged side disconnection process.

FIG. 3 is a diagram describing the state of the electric power supply system 1 after the fully charged side disconnection process related to the first structure. In FIG. 3, the alternating current electric power supply 60 of the external charging facility is schematically illustrated, and the direction of a flow of current is schematically illustrated by an arrow, in the same manner as FIG. 2.

The example illustrated in FIG. 3 is an illustration of when the first lithium ion battery 51 reaches the full state of charge first. In such a case, the relay SMRG1 is set to the open state. Accordingly, as schematically illustrated by a dotted line in FIG. 3, the first lithium ion battery 51 is electrically disconnected from the first circuit 21. Accordingly, the second lithium ion battery 52 can be charged to a desired state of charge (for example, the full state of charge) through the charger 10 while preventing the first lithium ion battery 51 from being overcharged.

While the electric power supply system 1 having two structures of electric power supply circuits can realize a redundant structure that is robust against failure, the state of charge (SOC) may be different between the first lithium ion battery 51 and the second lithium ion battery 52. Such a difference in state of charge is caused by individual characteristics of the first lithium ion battery 51 and the second lithium ion battery 52, a difference in use between the first lithium ion battery 51 and the second lithium ion battery 52, a difference in characteristic between the first circuit 21 and the second circuit 22, and the like. When the first lithium ion battery 51 and the second lithium ion battery 52 are charged through the charger 10 with the difference in state of charge, any one of the first lithium ion battery 51 and the second lithium ion battery 52 may reach the full state of charge first. Even without the difference in state of charge at the start of charging, a difference in electric power acceptability may also cause any one of the first lithium ion battery 51 and the second lithium ion battery 52 to reach the full state of charge first. In either case, when one of the first lithium ion battery 51 and the second lithium ion battery 52 reaches the full state of charge first, the one that reaches the full state of charge first needs to be prevented from being overcharged. For example, there is a method of finishing charging when one of the first lithium ion battery 51 and the second lithium ion battery 52 reaches the full state of charge first. However, such a method cannot charge the state of charge of the other to a desired state of charge.

According to the present embodiment, the relay SMRG1 is set to the open state when the first lithium ion battery 51 reaches the full state of charge first. Thus, the second lithium ion battery 52 can be charged to a desired state of charge through the charger 10 while preventing the first lithium ion battery 51 from being overcharged.

In the present embodiment, when the first lithium ion battery 51 reaches the full state of charge first, the relay SMRG1 is set to the open state, but the relay CHR1 is maintained in the close state. However, both of the relay SMRG1 and the relay CHR1 may be set to the open state when the first lithium ion battery 51 reaches the full state of charge first. However, such a modification example has the following problem which makes the present embodiment more advantageous than the modification example. Specifically, as described above, the charger 10 performs a charging operation by receiving electric power supplied from the lead battery PbB1. Thus, when the relay CHR1 is set to the open state with the first lithium ion battery 51 reaching the full state of charge first, the electric power of the lead battery PbB1 is consumed, and the state of charge of the lead battery PbB1 is decreased. When the lead battery PbB1 does not have the full state of charge at the time of the first lithium ion battery 51 reaching the full state of charge first, the state of charge of batteries as a whole cannot be increased. From such a point, according to the present embodiment, the relay CHR1 is maintained in the close state even when the first lithium ion battery 51 reaches the full state of charge first. Thus, the problem arising in the modification example can be resolved.

Specifically, according to the present embodiment, the relay SMRG1 is set to the open state, but the relay CHR1 is maintained in the close state as schematically illustrated by an arrow in FIG. 3. Thus, charging of the lead battery PbB1 through the charger 10 can be continued as schematically illustrated by the arrow in FIG. 3. Accordingly, the state of charge of batteries as a whole can be increased.

When the second lithium ion battery 52 reaches a predetermined level or higher of a state of charge first of the first lithium ion battery 51 and the second lithium ion battery 52 after the control device 40 starts charging the first lithium ion battery 51 and the second lithium ion battery 52, the control device 40 sets the relay SMRG2 (a relay related to the second lithium ion battery 52) to the open state of the relays SMRG1, SMRG2. In such a case, the relays CHR1, CHR2, SMRB11, SMRB21, SMRG1 are maintained in the close state. Hereinafter, the process of setting the relay SMRG2 to the open state due to the second lithium ion battery 52 reaching the full state of charge earlier than the first lithium ion battery 51 will be referred to as a "fully charged side disconnection process" related to a second structure.

Accordingly, the relay SMRG2 is set to the open state when the second lithium ion battery 52 reaches the full state of charge first. Thus, the first lithium ion battery 51 can be charged to the full state of charge through the charger 10 while preventing the second lithium ion battery from being overcharged.

The relay CHR2 is maintained in the close state in the fully charged side disconnection process related to the second structure. However, the present disclosure is not limited thereto. As described above, since the charger 10 performs a charging operation by receiving electric power supplied from the lead battery PbB1, the relay SMRG2 does not need to be maintained in the close state in the fully charged side disconnection process related to the second structure. For example, when the lead battery PbB2 has the full state of charge at the time of the second lithium ion battery 52 reaching the full state of charge first, the control device 40 may electrically disconnect the second circuit 22 by switching the relay CHR2 to the open state. When the lead battery PbB2 does not have the full state of charge at the time of the second lithium ion battery 52 reaching the full state of charge first, the control device 40 may continue charging the lead battery PbB2 through the charger 10 by maintaining the relay CHR2 in the close state.

Next, an example of operation of the control device 40 related to control of charging through the charger 10 will be described with reference to FIG. 2 to FIG. 4.

Figure 4:
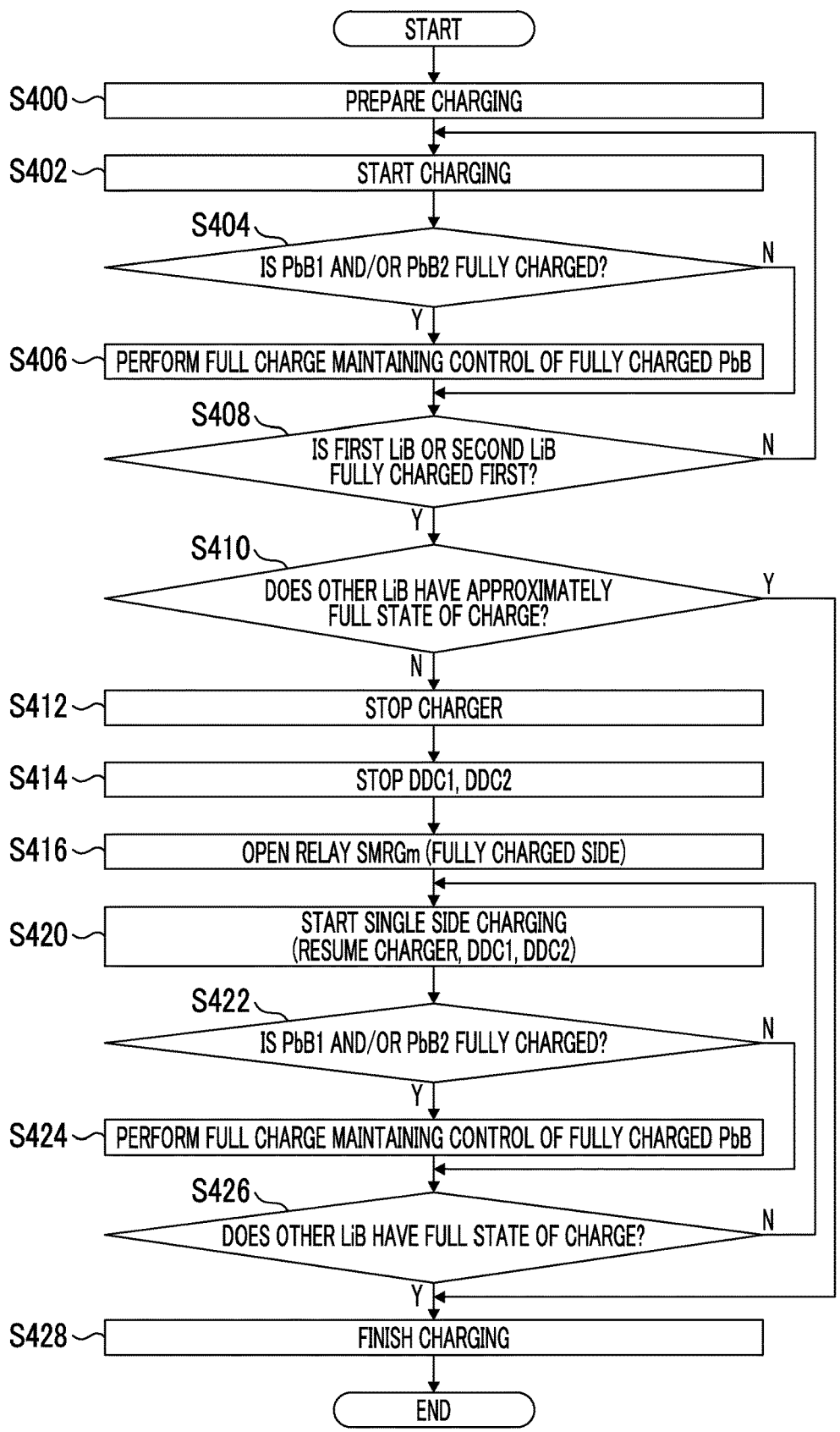
FIG. 4 is a schematic flowchart illustrating one example of a process of a control device that is related to control of charging through a charger.

FIG. 4 is a schematic flowchart illustrating one example of a process of the control device 40 that is related to control of charging through the charger 10. In FIG. 4, for simplification purposes, the state in which the charger 10 is connected to the external charging facility is assumed to be continued until charging is normally finished (until END in FIG. 4).

The process in FIG. 4 is started when the state in which the charger 10 is connected to the external charging facility is detected.

In step S400 in FIG. 4, the control device 40 prepares charging. Preparation of charging includes, for example, starting the first controller 41 and the like needed for charging, checking a CPLT signal, and determining other charging start conditions.

In step S402 in FIG. 4, the control device 40 starts charging through the charger 10. Specifically, the control device 40 sets the relays CHR1, CHR2, SMRG1, SMRG2, SMRB11, SMRB21 to the close state, operates the charger 10 (causes the charger 10 to perform a charging operation), and operates the DC-DC converters DDC1, DDC2. Accordingly, the first lithium ion battery 51, the second lithium ion battery 52, the lead battery PbB1, and the lead battery PbB2 start to be charged through the charger 10 at the same time. As a modification example, the relays SMRG1, SMRG2, SMRB11, SMRB21 may be set to the close state at different timings, and the first lithium ion battery 51, the second lithium ion battery 52, the lead battery PbB1, and the lead battery PbB2 may start to be charged through the charger 10 at different timings.

In step S404 in FIG. 4, the control device 40 determines whether or not at least one of the lead battery PbB1 and the lead battery PbB2 is fully charged. When at least one of the lead battery PbB1 and the lead battery PbB2 is fully charged, the control device 40 transitions to step S406 in FIG. 4. Otherwise, the control device 40 transitions to step S408 in FIG. 4.

In step S406 in FIG. 4, a target value Vt of the output voltage of a DC-DC converter (hereinafter, referred to as a "DC-DC converter DDCn"), of the DC-DC converters DDC1, DDC2, that is related to the fully charged lead battery (hereinafter, referred to as a "lead battery PbBn") of the lead battery PbB1 and the lead battery PbB2 is set by the control device 40 to a value acquired by adding a predetermined value α (one example of first and second predetermined values) to an open-circuit voltage Vocv(n) of the lead battery PbBn. That is, Vt=Vocv(n)+α is established. The open-circuit voltage Vocv(n) of the lead battery PbBn can be calculated based on the state of charge and the temperature of the lead battery PbBn. For example, the open-circuit voltage Vocv(n) of the lead battery PbBn can be calculated based on characteristic data that indicates a relationship among the open-circuit voltage, the temperature, and the SOC of the lead battery PbBn. The predetermined value α is a value that corresponds to the amount of decrease in voltage from a low voltage side terminal of the DC-DC converter DDCn to the lead battery PbBn due to a wire resistance or the like. Hereinafter, control of the fully charged lead battery will be referred to as "full charge maintaining control".

In step S408 in FIG. 4, the control device 40 determines whether the first lithium ion battery 51 or the second lithium ion battery 52 is fully charged first. When either of the first lithium ion battery 51 or the second lithium ion battery 52 is fully charged first, the control device 40 transitions to step S410 in FIG. 4. Otherwise, the control device 40 returns to step S402 in FIG. 4 and continues charging the first lithium ion battery 51, the second lithium ion battery 52, and the like.

In step S410 in FIG. 4, the control device 40 determines whether or not the state of charge of one of the first lithium ion battery 51 and the second lithium ion battery 52 that is not fully charged is approximately the full state of charge. When the state of charge of the one that is not fully charged is approximately the full state of charge, further charging is not needed, and the control device 40 transitions to step S428 in FIG. 4. When the state of charge of the one that is not fully charged is significantly lower than the full state of charge, further charging is needed, and the control device 40 transitions to step S412 in FIG. 4.

In step S412 in FIG. 4, the control device 40 temporarily stops the charging operation of the charger 10.

In step S414 in FIG. 4, the control device 40 temporarily stops the DC-DC converters DDC1, DDC2.

In step S416 in FIG. 4, a relay (hereinafter, referred to as a "relay SMRGm"), of the relays SMRG1, SMRG2, that is related to the lithium ion battery on the fully charged side of the first lithium ion battery 51 and the second lithium ion battery 52 is set to the open state by the control device 40 (fully charged side disconnection process). Accordingly, as described above, the lithium ion battery on the fully charged side of the first lithium ion battery 51 and the second lithium ion battery 52 is electrically disconnected from the circuit of the electric power supply system 1. Step S412 in FIG. 4 and step S414 in FIG. 4 are processes for preventing the relay SMRGm from being stuck or the like. That is, step S412 in FIG. 4 and step S414 in FIG. 4 are executed in order to switch the relay SMRGm from the close state to the open state in a state of no flow of current.

In step S420 in FIG. 4, the control device 40 starts charging one of the first lithium ion battery 51 and the second lithium ion battery 52 that is not fully charged (single side charging). Specifically, the control device 40 resumes the charging operation of the charger 10 and operates the DC-DC converters DDC1, DDC2 again.

In step S422 in FIG. 4, the control device 40 determines whether or not at least one of the lead battery PbB1 and the lead battery PbB2 is fully charged. When at least one of the lead battery PbB1 and the lead battery PbB2 is fully charged, the control device 40 transitions to step S424 in FIG. 4. Otherwise, the control device 40 transitions to step S426 in FIG. 4.

In step S424 in FIG. 4, the control device 40 performs the full charge maintaining control (refer to step S406 in FIG. 4) of the fully charged lead battery of the lead battery PbB1 and the lead battery PbB2.

In step S426 in FIG. 4, the control device 40 determines whether or not the one of the first lithium ion battery 51 and the second lithium ion battery 52 that is not fully charged reaches the full state of charge. When the one that is not fully charged reaches the full state of charge, the control device 40 transitions to step S428 in FIG. 4. Otherwise, the control device 40 returns to step S420 in FIG. 4 and continues single side charging.

In step S428 in FIG. 4, the control device 40 normally finishes charging. Specifically, the control device 40 stops the charger 10 and stops the DC-DC converters DDC1, DDC2. Then, the control device 40 switches relays in the close state such as the relay SMRGm to the open state.

According to the process illustrated in FIG. 4, when the first lithium ion battery 51 or the second lithium ion battery 52 reaches the full state of charge first, charging of the lithium ion battery that does not have the full state of charge can be continued. Accordingly, while one of the first lithium ion battery 51 and the second lithium ion battery 52 that reaches the full state of charge first is prevented from being overcharged, the lithium ion battery that does not have the full state of charge can be charged to the full state of charge through the charger 10.

According to the process illustrated in FIG. 4, even when the first lithium ion battery 51 or the second lithium ion battery 52 reaches the full state of charge first, charging of the lead battery PbB1 and the lead battery PbB2 can be continued during charging of the lithium ion battery that does not have the full state of charge. Accordingly, the state of charge of batteries as a whole can be increased.

According to the process illustrated in FIG. 4, the full charge maintaining control is executed when any or both of the lead battery PbB1 and the lead battery PbB2 reach the full state of charge. Thus, the full state of charge of the lead battery that reaches the full state of charge can be maintained, and the lead battery can be prevented from being overcharged.

While the embodiment is described in detail heretofore, the present disclosure is not limited to a specific embodiment. Various modifications and changes can be made. All or a plurality of constituent elements of the embodiment may be combined with each other.

For example, while the first lithium ion battery 51 and the second lithium ion battery 52 that generate 52 V electric power are used in the embodiment, batteries having a high voltage significantly exceeding 60 V may be used instead of the first lithium ion battery 51 and the second lithium ion battery 52. When batteries having a high voltage significantly exceeding 60 V are used, the ground line 230 is electrically insulated between the low voltage structure and the high voltage structure. In such a case, the high voltage batteries may be batteries other than lithium ion batteries.

While the charger 10 performs a charging operation by receiving electric power supplied from the lead battery PbB1 in the embodiment, the charger 10 may perform a charging operation by receiving electric power supplied from any selected one of the lead battery PbB1 and the lead battery PbB2. In such a case, it is preferable that the structure that supplies electric power to the charger 10 from the lead battery PbB1 be electrically insulated from the structure that supplies electric power to the charger 10 from the lead battery PbB2. Accordingly, a problem that a failure (for example, a ground fault) in one structure affects the other structure can be avoided. In such a case, when the lead battery PbB1 has the full state of charge at the time of the first lithium ion battery 51 reaching the full state of charge earlier than the second lithium ion battery 52, the control device 40 may switch the relays CHR1, SMRG1, SMRB11 in the first circuit 21 to the open state.

While the relay SMRG1 is disposed between the first lithium ion battery 51 and the ground line 230 in the embodiment, the present disclosure is not limited thereto. The relay SMRG1 may be disposed between the first high electric potential side line 210 and the first lithium ion battery 51. The same applies to the relay SMRG2.

The lead battery PbB1, the DC-DC converter DDC1, the first low voltage structure load 71, and the first predetermined load 31 disposed in the embodiment may be omitted. The same applies to the lead battery PbB2, the DC-DC converter DDC2, the second low voltage structure load 72, and the second predetermined load 32.

What is claimed is:

1. An electric power supply system comprising:
   a charger;
   a first high electric potential side line that is connected to a high electric potential side of the charger;
   a second high electric potential side line that is connected to the high electric potential side of the charger;
   a first diode that is disposed on the first high electric potential side line and of which an anode side is connected to the charger;
   a second diode that is disposed on the second high electric potential side line and of which an anode side is connected to the charger;
   a first battery and a first load that are connected in parallel with each other between a ground and a cathode side of the first diode on the first high electric potential side line;
   a second battery and a second load that are connected in parallel with each other between the ground and a cathode side of the second diode on the second high electric potential side line;
   a first switch that is disposed between the first high electric potential side line and the first battery, or between the first battery and the ground;
   a second switch that is disposed between the second high electric potential side line and the second battery, or between the second battery and the ground; and
   a control device configured to:
      start charging the first battery and the second battery through the charger by setting the first and second switches to a close state and operating the charger; and
      switch the first switch to an open state and maintain the second switch in the close state when the first battery reaches a predetermined level or higher of a state of charge earlier than the second battery after the control device starts charging the first battery and the second battery.

2. The electric power supply system according to claim 1, further comprising:
   a first voltage conversion device that operates with direct current and is electrically connected to the first battery in a parallel relationship between the ground and the cathode side of the first diode on the first high electric potential side line;
   a third battery that has a lower rated voltage than the first battery and is electrically connected between the ground and a low electric potential side of the first voltage conversion device;
   a second voltage conversion device that operates with direct current and is electrically connected to the second battery in a parallel relationship between the ground and the cathode side of the second diode on the second high electric potential side line; and
   a fourth battery that has a lower rated voltage than the second battery and is electrically connected between the ground and a low electric potential side of the second voltage conversion device,
   wherein the control device is configured to charge the third battery and the fourth battery through the charger by operating the first voltage conversion device and the second voltage conversion device while charging the first battery and the second battery through the charger.

3. The electric power supply system according to claim 2, wherein the control device is configured to:
   when the third battery reaches a full state of charge while the control device charges the third battery through the charger, set a target value of an output voltage of the first voltage conversion device to a value acquired by adding a first predetermined value to an open-circuit voltage of the third battery, based on the open-circuit voltage of the third battery; and when the fourth battery reaches a full state of charge while the control device charges the fourth battery through the charger, set a target value of an output voltage of the second voltage conversion device to a value acquired by adding a second predetermined value to an open-circuit voltage of the fourth battery, based on the open-circuit voltage of the fourth battery.

4. The electric power supply system according to claim 2, wherein:
the first battery, the first load, the first voltage conversion device, and the third battery are connected commonly to a first ground line,
the second battery, the second load, the second voltage conversion device, and the fourth battery are connected commonly to a second ground line,
the first switch is disposed between the first battery and the first ground line, and
the second switch is disposed between the second battery and the second ground line.

5. The electric power supply system according to claim 1, wherein the first load and the second load consume electric power under control of the control device.

* * * * *